United States Patent [19]
Johnson et al.

[11] Patent Number: 5,822,021
[45] Date of Patent: Oct. 13, 1998

[54] COLOR SHUTTER LIQUID CRYSTAL DISPLAY SYSTEM

[75] Inventors: Kristina Johnson, Longmont; Gary D. Sharp, Boulder, both of Colo.; Jack P. Salerno, Waban, Mass.

[73] Assignee: ColorLink, Inc., Boulder, Colo.

[21] Appl. No.: 645,580

[22] Filed: May 14, 1996

[51] Int. Cl.[6] .................................. H04N 9/31; H04N 5/74
[52] U.S. Cl. .......................... 348/742; 348/751; 349/18; 349/80
[58] Field of Search .................................. 359/93, 53, 56, 359/63, 73, 70, 100, 260; 348/742, 744, 751, 752, 761, 762; 349/18, 78, 80, 117; H04N 9/31, 5/74

[56] References Cited

U.S. PATENT DOCUMENTS

| | | | |
|---|---|---|---|
| 2,493,200 | 1/1950 | Land | 88/112 |
| 4,003,081 | 1/1977 | Hilsum et al. | 358/64 |
| 4,019,808 | 4/1977 | Scheffer | 350/160 LC |
| 4,232,948 | 11/1980 | Shanks | 350/347 |
| 4,367,924 | 1/1983 | Clark et al. | 350/334 |
| 4,416,514 | 11/1983 | Plummer . | |
| 4,582,396 | 4/1986 | Bos et al. | 350/347 |
| 4,758,818 | 7/1988 | Vatne | 340/701 |
| 4,786,146 | 11/1988 | Ledebuhr | 350/331 R |
| 4,786,964 | 11/1988 | Plummer et al. . | |
| 4,808,501 | 2/1989 | Chiulli . | |
| 4,917,465 | 4/1990 | Connor et al. . | |
| 4,995,702 | 2/1991 | Aruga . | |
| 5,050,965 | 9/1991 | Connor et al. | 359/53 |
| 5,124,818 | 6/1992 | Conner et al. | 359/53 |
| 5,132,826 | 7/1992 | Johnson et al. . | |
| 5,231,432 | 7/1993 | Glenn . | |
| 5,243,455 | 9/1993 | Johnson et al. | 359/93 |
| 5,276,436 | 1/1994 | Shaw et al. . | |
| 5,321,450 | 6/1994 | Shapiro et al. . | |
| 5,337,103 | 8/1994 | Gulick . | |
| 5,347,378 | 9/1994 | Handschy et al. | 359/53 |
| 5,353,075 | 10/1994 | Connor et al. . | |
| 5,355,188 | 10/1994 | Biles et al. . | |
| 5,381,253 | 1/1995 | Sharp et al. . | |
| 5,400,095 | 3/1995 | Minich et al. . | |
| 5,500,523 | 3/1996 | Hamanaka | 250/216 |
| 5,510,861 | 4/1996 | Minich et al. . | |

FOREIGN PATENT DOCUMENTS

| | | |
|---|---|---|
| 0121379 | 5/1988 | Japan . |
| 4-022920 | 1/1992 | Japan . |
| WO95/26110 | 9/1995 | WIPO . |

OTHER PUBLICATIONS

Scheffer, T.J., "New Multicolor Liquid Crystal Displays That Use a Twisted Nematic Electro–Optical Cell," J. Appl. Phys. (1973) 44 (11):4799–4803.

Carlsen, W. J. and Buhrer, C.F., "Flat Passband Birefringent Wavelength–Division Multiplexers," Electronics Letters (1987) 23 (3):106–107.

Wright, H. et al., "Active Filters Enable Color Imaging," Laser Focus World (May 1996) 85–90.

Cambridge Research & Instrumentation, Inc., "Liquid Crystal Tunable Filter," Cambridge, MA 2 pages.

Displaytech, Inc. (Jan. 1996), "Switchable Color Filter", Boulder, CO, 4 pages.

Title, A.M. and Rosenberg, W.J., "Tunable Birefringent Filters," Opt. Eng. (1981) 20(6):815–823.

Solc, Ivan, "Birefringent Chain Filters," J. Opt. Soc. Am. (1965) 55(6):621–625.

Wu, Shin–Tson, "Birefringence dispersions of liquid crystals," Physical Review A, (1986) 33(2):1270–1274.

(List continued on next page.)

*Primary Examiner*—Glenton B. Burgess
*Attorney, Agent, or Firm*—Fleshner & Kim

[57] ABSTRACT

The present invention relates to a liquid crystal display system in which a pair of transmission displays are used with a light source, and coupling optics to provide a small, high resolution optically efficient color imaging system. A preferred embodiment of the system comprises a color shutter to control color transmission through each liquid crystal display.

30 Claims, 10 Drawing Sheets

OTHER PUBLICATIONS

Harris, S.E. et al., "Optical Network Synthesis Using Birefringent Crystals," J. Opt. Soc. America (1964) 54(10):1267–1279.

Amman, E.O., "Optical Network Synthesis Using Birefringent Crystals, III. Some General Properties of Lossless Birefringent Networks", J. Opt. Soc. America (1966) 56(7):943–951.

Amman, E.O. and Yarborough, J.M., "Optical Network Synthesis Using Birefringent Crystals. V. Synthesis of Lossless Networks Containing Equal–length Crystals and Compensators," J. Opt. Soc. America (1966) 56(12):1746–1754.

Sharp, G.D. et al., "P–60: Color Switching Using Ferroelectric Liquid Crystals," Society for Information Display, International Symposium, Digest of Technical Papers, vol. XXIV, Seattle, Washington, May 18–20, 1993.

COLOR SHUTTER LIQUID CRYSTAL DISPLAY SYSTEM

BACKGROUND OF THE INVENTION

Many existing liquid crystal display systems are used for the projection of color images. These display systems have utilized three liquid crystal displays which are positioned to combine the three images, each having a distinct primary color, into a single colored image using a dichroic prism or cube such that the image is projected with a lens for viewing. This system is relatively expensive requiring the use of three display panels and a dichroic cube that is costly to manufacture within the tolerances required for a bright high resolution display.

Although this type of system increases the resolution and optical efficiency relative to the use of single displays using color filter systems, the optics and alignment mechanism necessary to separate the colors and combine the generated images from the three light valves has required large spatial volumes, including the light source and projection lens and the larger optical path. These systems are also relatively heavy and are thus not well suited for compact portable systems.

A continuing need exists, however, for smaller, more portable display systems which have high resolution and full color capabilities, and at the same time are readily and inexpensively manufactured.

SUMMARY OF THE INVENTION

The present invention relates to the use of two liquid crystal displays and one or two color shutters to form and display high resolution images on a viewing surface. A preferred embodiment of the system employs a pair of displays in an optical system to separate light from a lamp along two optical paths, each path directed through one display and one shutter. The images generated along each path are then combined to form a color image that can be directed through a projection lens onto a viewing surface.

A dichroic or color polarizer mirror is used to separate light from the source into two components with a first component having a first color, for example blue, that is directed along the first optical path and the second component having a plurality of colors, red and green in this example, being directed along the second optical path. A color shutter issued along the path containing two primary colors to control color transmission the display. Two shutters can be used, one along each path, where more than one primary color is used along each path. In one embodiment, the red and a portion of the green spectrum can be transmitted along one path and the blue with a second portion of the green can be transmitted along the second path. This structure permits timing of the two shutters so that one of the green components is always transmitted on one path with either red or blue on the remaining path.

The two light valves are mounted to a dichroic prism which combines the two generated images into a single color image. The advantages of this approach include the increase of the image resolution afforded by the use of two light valves relative to the use of a single light valve having three separate colors. Instead of three pixels being used to generate a single image pixel in the single light valve system, a combination of pixels from two light valves are used to generate an image pixel. The light valves can be passive or active matrix type displays using nematic or chiral smectic liquid crystal material. At least one of the displays can also be a field emission display, an electroluminescent display, a reflective flat panel display, or a CRT.

Another preferred embodiment utilizes two liquid crystal displays and a color shutter that are aligned along a common optical axis to provide an efficient, high resolution color display system. The color shutter system switches between two subtractive complementary colors such as cyan and magenta or yellow and magenta or cyan and yellow. The color shutter can switch between cyan and magenta, for example, such that the first liquid crystal display modulates either green or red. The second liquid crystal display in this example modulates blue only. A retarder is used in the system to generate circularly polarized blue light from linearly polarized light leaving the red and green light preferably unaltered. Microlens arrays can be used before and after each liquid crystal display to further improve optical efficiency.

Another preferred embodiment utilizes a three light valve system using retarders and microlens arrays to provide an in-line color display system.

As one display can be used to control one primary color such as green or blue, there is reduced flicker. The luminance signal (primarily in green) for that primary color is transmitted in each frame. Note that brightness can be increased if green is the primary color transmitted in each frame. The display transmitting one primary color of high luminance lowers the display speed tolerance of the remaining display to 120 Hz or less, as the resulting slower chromatic changes will not produce perceptible artifacts. The displays can consequently be operated at a speed in the range of 60–80 Hz. Higher operating speeds above 120 Hz can also be used to further reduce artifacts including perception artifacts commonly associated with color sequential operation.

This system has a number of applications including use with color projection systems, overhead projection systems, head mounted systems and other direct view displays such as hand held personnel data and communication displays and laptop computers. The invention is particularly well suited for display applications requiring high brightness, high resolution and good color quality and yet must be limited in physical size. The invention is useful for displays having at least 640×480 color resolution or higher such as 800×600, 1024×768 or 1280×1024, although over lower or higher resolution devices can also be used.

In another preferred embodiment, light from the source is split such that one primary color is directed along one optical path through a first liquid crystal display and the two remaining primary colors are directed through a second liquid crystal display which modulates the remaining two primary colors by using a two color filter pattern. The two images are then combined using a standard color combiner or a polarizing beamsplitter.

DETAILED DESCRIPTION OF PREFERRED EMBODIMENTS

Figure 1:
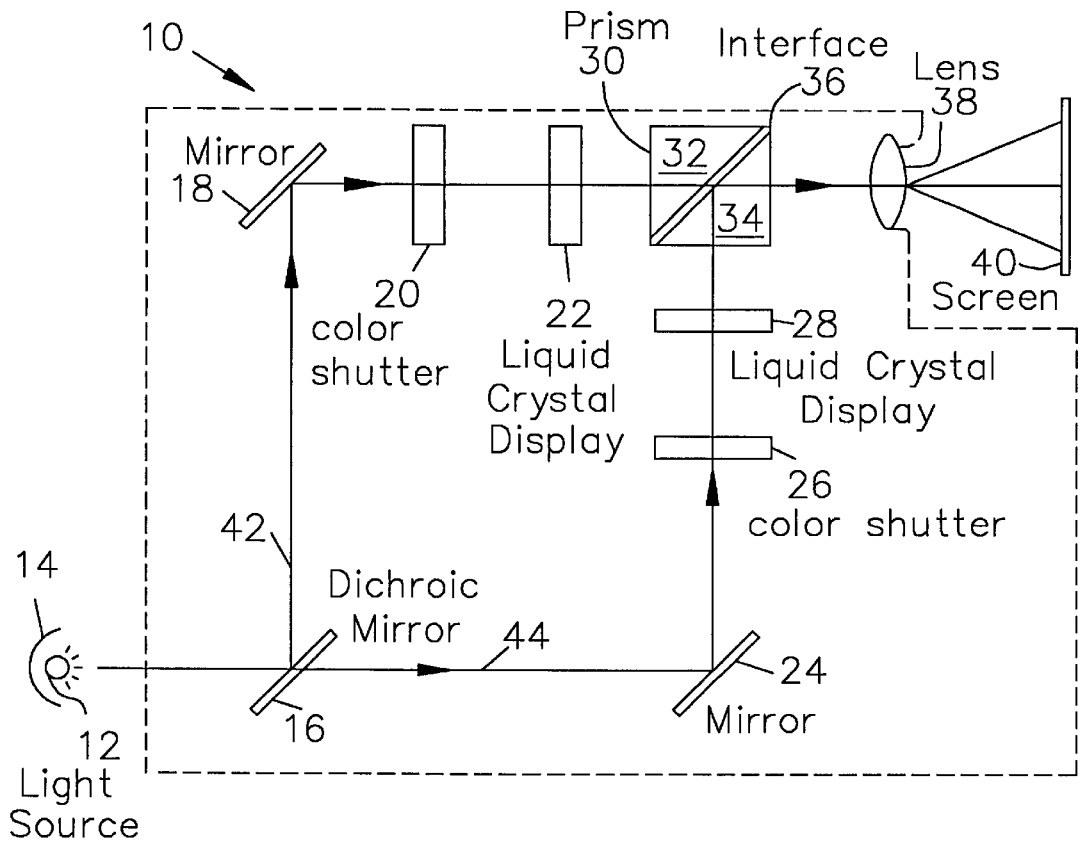
FIG. 1 is a schematic diagram of a two color shutter display system in accordance with the invention.

As illustrated in FIG. 1, a preferred embodiment of the invention is a projection system 10 having first and second liquid crystal displays 22, 28, which are aligned with first and/or second color shutters or switches 20, 26, respectively.

The system 10 includes a light source 12, a reflector 14 to direct the light through a dichroic mirror 16 which splits the light along two optical paths 42, 44. Light directed along path 42 is first reflected by mirror 18 onto a first color shutter 20, through the liquid crystal display 22 and into the combining prism 30. The light source can be a metal halide lamp, tungsten halogen lamp or a xenon arc lamp.

Light directed along path 44 is reflected by mirror 24 through a second color shutter 26 and a second liquid crystal display into combiner 30. The combiner 30 can include two elements 32, 34 contacting each other at interface 36 which combines the two images to form a single image that is projected onto viewing surface 40 with projection lens 38. Color shutters 20,26 are used to selectively control the transmission of selected wavelengths of light onto the respective liquid crystal displays 22,28. The shutters 20,22 use smectic and/or chiral smectic liquid crystal material as described in more detail in U.S. Pat. Nos. 5,132,826, 5,231, 521 and 5,243,455 of Johnson et al., the entire contents of these patents being incorporated herein by reference. The shutters can also be Pi-Cell, homogeneous nematic or other nematic configurations that serve to provide a polarization switch. The shutters 20,26 can be used in combination to sequentially transmit three primary colors, i.e, red, green and blue, such that the two images produced by displays 22,28, when combined by the combiner 30, provide a full color image.

In a preferred embodiment, only one shutter need be used which alternates between two primary colors. In this embodiment, one display receives one of two primary colors transmitted at a given time by the shutter, while the other display controls transmission of only one primary color. In one illustrative example of this embodiment, shutter 26 is removed and dichroic mirror 16 directs blue light along path 44 through display 28, and red and green are directed along path 42 to the single shutter 20 which switches between two states to transmit red and green sequentially onto display 22. Display 22 operates at a higher speed than display 28 to generate red and green frames for each blue frame.

Another preferred embodiment is illustrated in connection with FIG. 2A where all of the optical components are positioned along a common axis 75. In this system 60, a lamp 12 and reflector 14 direct light through a color shutter system 62 that preferably comprises either two or three color shutters. The transmitted light is directed through a first retarder 64 and a first liquid crystal display panel 66. The resulting transmitted light is then directed through a second retarder 68, a neutral polarizer 70, a second liquid crystal display 72 and an output polarizer 74. The output polarizer can be a pleochroic material or a cholesteric material. The resulting color image can be projected by a lens 38 onto a viewing surface 40. The optical components can form a stack or laminated structure 65 that is less than 25 millimeters and preferably less than 10 millimeters. Each liquid crystal display and the color shutter have thicknesses in the range of 1–3 mm. The remaining components in the stack are preferably between 0.5–2 mm.

Figure 2A:
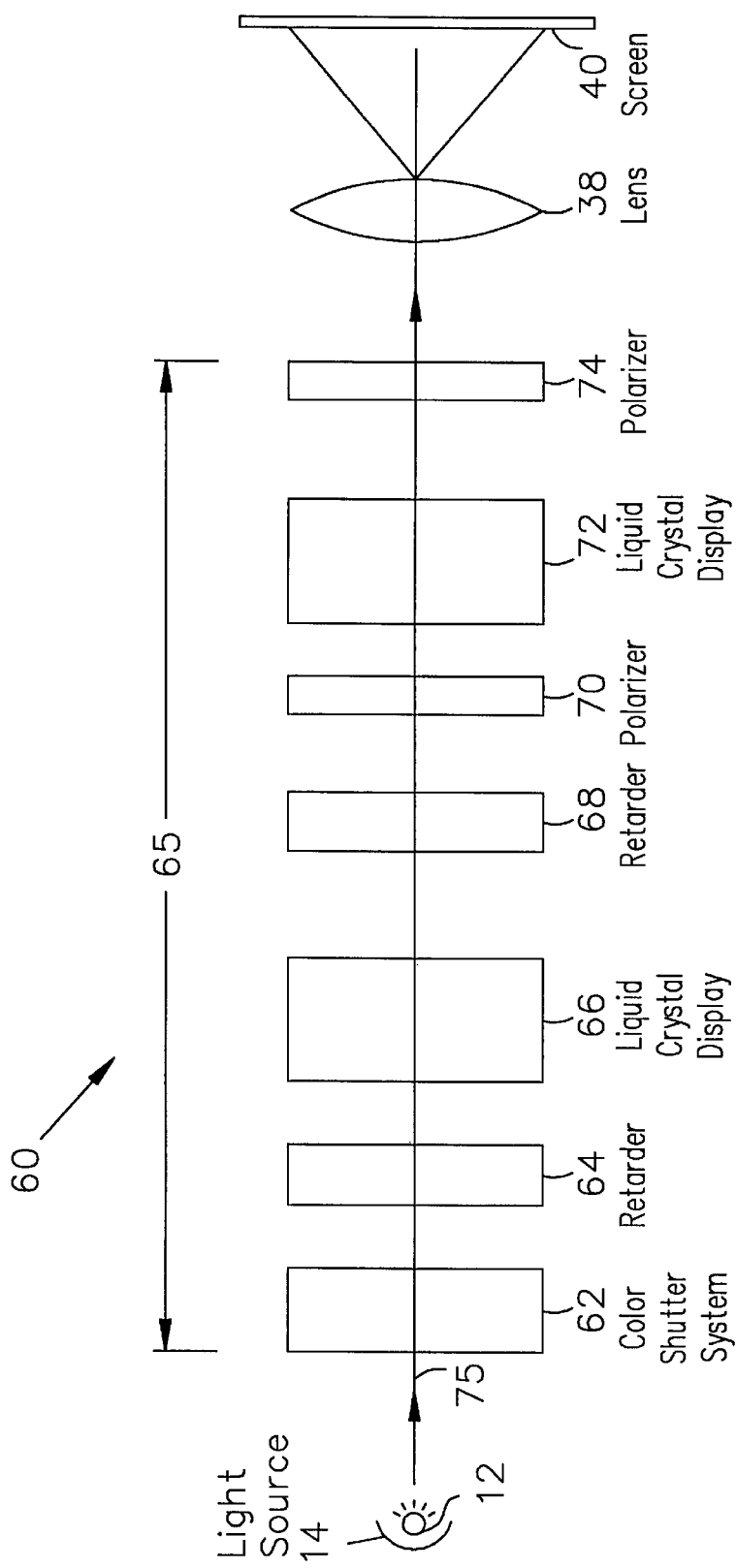
FIG. 2A is a detailed schematic diagram of a color shutter display system aligned along a common axis with two liquid crystal displays.
Figure 2B:
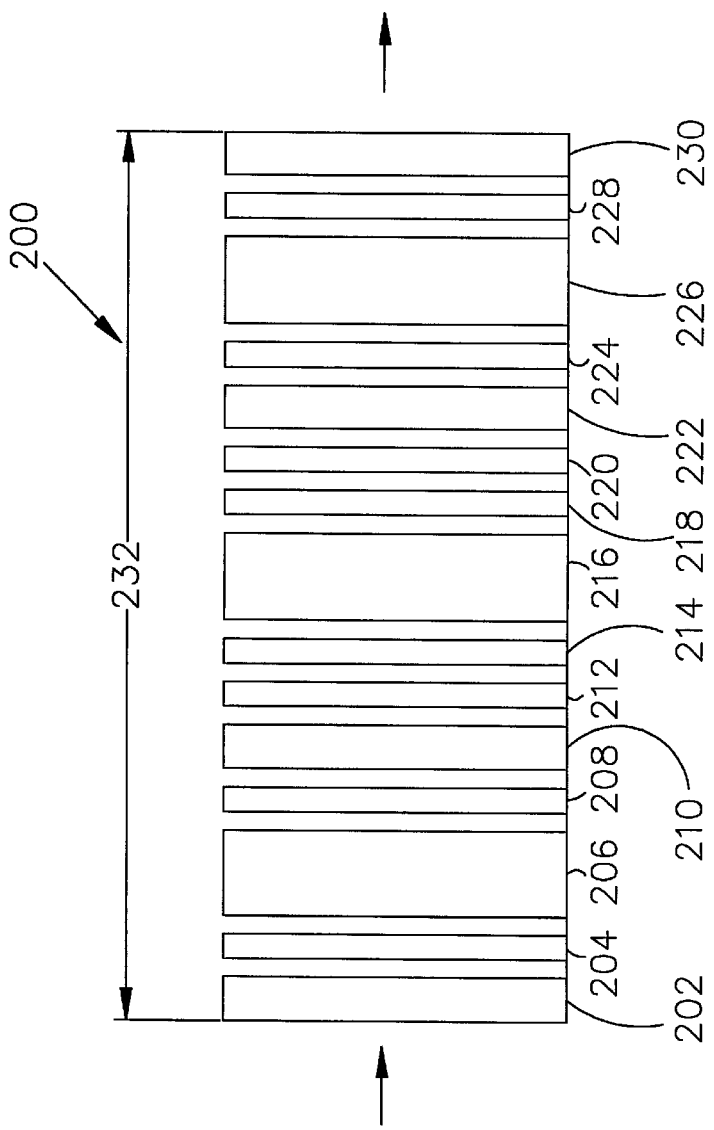
FIG. 2B is a schematic diagram of a co-linear display system using three liquid crystal displays.

Illustrated in FIG. 2B is a three light valve system 200 having a total thickness 232 of less than 2 cm and preferably less than 5 mm. This system uses three liquid crystal displays 206,216 and 226, along with retarders 212, 220, microlens arrays 204, 208, 214, 218, 224, 228 and polarizers 202, 210, 222, 230 to provide a full color linear display system. For example, in one embodiment polarizer 202 polarizes only green leaving red and blue unpolarized. Linear polarizer 210 linearly polarizes all colors while retarder 212 circularly polarizes blue. Retarder 220 returns blue to a linear state after transmission through display 216. Polarizer 222 analyzes only red while passing blue and green unaltered. Polarizer 230 polarizes only blue.

Figure 2C:
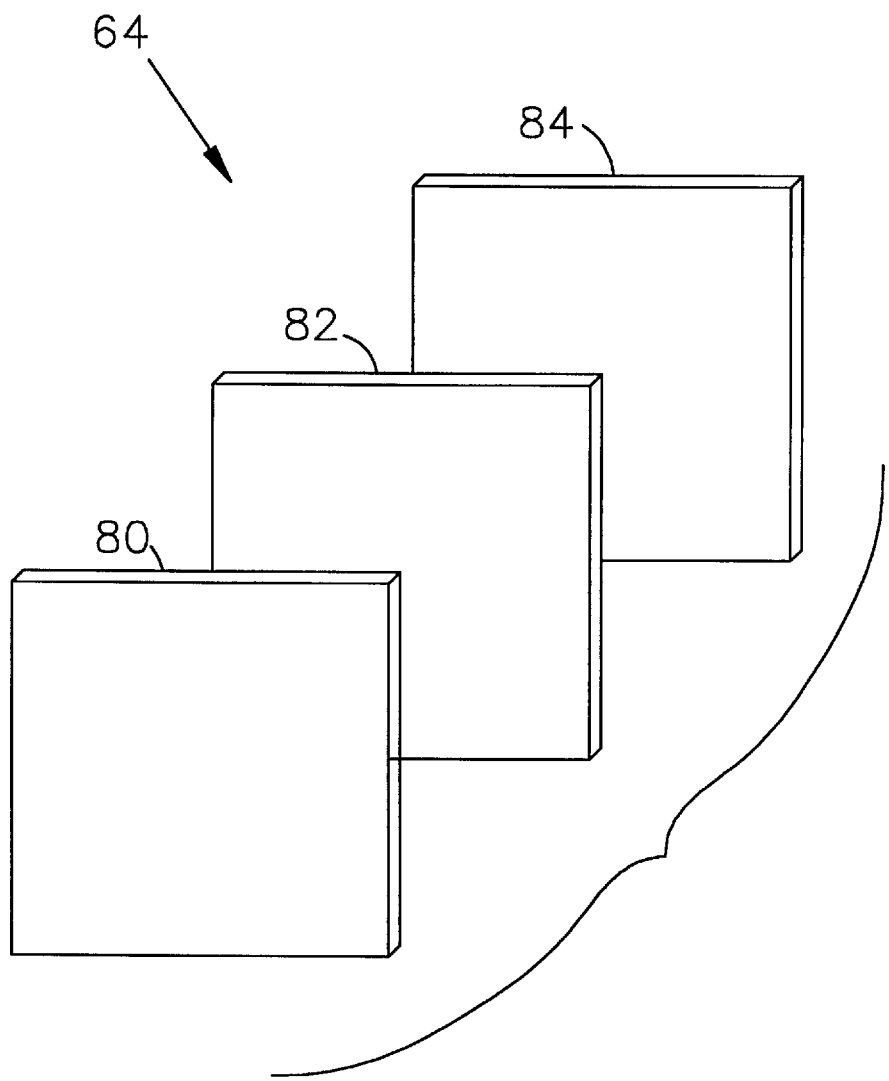
FIG. 2C is a preferred embodiment of a retarder used in the display system of FIG. 2B.
Figure 2D:
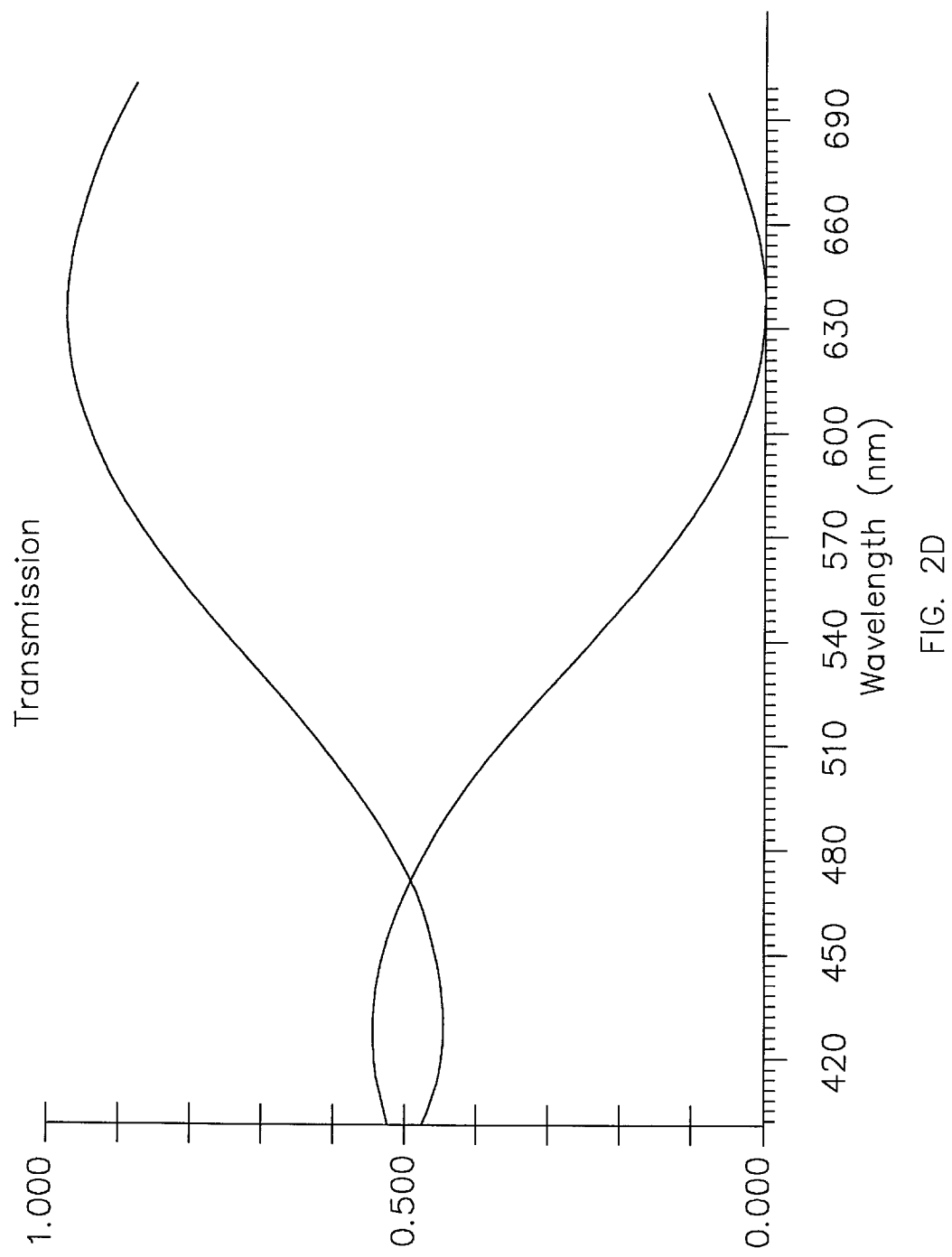
FIG. 2D graphically illustrates transmission characteristics of a preferred retarder system illustrated in FIG. 2B.

The retarders 64,68 can be the passive compound retarders as illustrated in FIG. 2C used for a three valve system. In this particular example, a retarder circularly polarizes blue light (i.e. a quaterwave in the blue), and is a fullwave plate in the red. The retarders can be made of polycarbonate or polyvinyl alcohol (PVA) films. The three retarders 80,82, 84 are aligned in a stack with the first and third elements 80,84 rotating by 14.1° with the same retardance and the middle element 82 rotating by 84.7° with a higher retardance. The transmissive characteristics of this retarder are illustrated in FIG. 2D where the upper curve is the optical transmission of the retarder between two parallel polarizers and the lower curve illustrates the transmission of the retarder between two crossed polarizers.

Another preferred embodiment of color shutter 62 is a two color shutter switching between red and green without polarizing blue. For example, color shutters using cholesteric materials can be used such as those described in U.S. Ser. No. 08/131,724 filed on Oct. 5, 1993 now U.S. Pat. No. 5,619,355 and entitled Liquid Crystal Handedness Switch and Color Filter, by Kristina M. Johnson and Gary D. Sharp, the contents of which is incorporated herein in its entirety. The blue light is transmitted unaltered and unpolarized from lamp 12 in this embodiment. Following shutter 62 is element 64 which is an achromatic one-quarter wave plate. Liquid crystal display 66 modulates red or green without altering the blue portion of the transmitted spectrum. In this embodiment element 66 is followed immediately by a neutral density polarizer 70. Element 70 can be a neutral density linear polarizer or an achromatic quarterwave plate with a cholesteric film or film or a circular polarizer with an achromatic quarterwave plate or any equivalent thereof. Element 70 is now followed by liquid crystal display 72, which is followed by a output polarizer 74 which only modulates blue light. Output polarizer 74 can be a pleochroic dye polarizer which polarizes only blue light or a cholesteric liquid crystal polarizer in combination with a quarterwave plate. If the output polarizer is a neutral density polarizer, a pair of retarders is placed before and after liquid crystal display 72.

The purpose of the compound retarder system can thus be characterized as the preconditioning of one region of the spectrum being transmitted by the system to make that region an eigenstate of a light valve within the system. The compound retarder provides a system that can selectively control the transmission of different regions or primary colors at different light valves positioned sequentially in the system.

For a two valve system, the retarder described above shifts one-quarter wave in the blue and a full wave in the green and red, in one particular example. This is an illustrative example of a passive retarder, however active or variable retarders such as those described in U.S. Pat. No. 5,381,253 the contents of which is incorporated herein by reference, can also be used.

Figure 3:
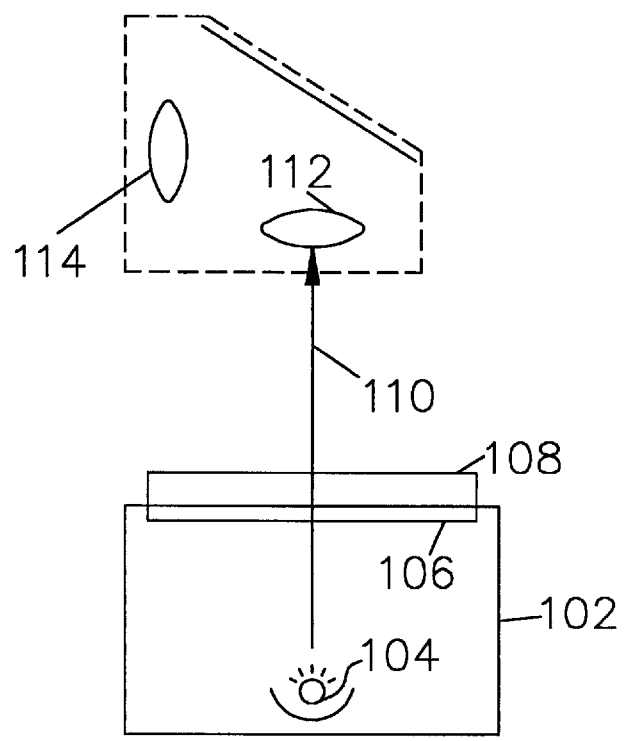
FIG. 3 illustrates the use of a shutter system for an overhead projector.

The system illustrated in FIG. 2A including the components 62, 64, 66, 68, 70, 72 and 74 can be mounted within a housing for use with an overhead projector. Such a system is illustrated in FIG. 3 where housing 108 provides a color shutter imaging system that is used with an overhead projector 102. The lamp 104 within the projector directs light along axis 110 through the panel 106 which normally supports a transparency, a monochromatic display, or a color filter display. The housing 108 instead provides a high resolution color image that is directed through the lens system 112, 114 of the projector.

The housing 108 supports a light modulating system such as that described in FIG. 2A and encases modulation control circuitry for controlling the light modulating system. The housing 108 includes an support element for supporting the light modulating element along its margins so that it can modulate light transmitted from the overhead projection light surface. The housing 108 improves storage, portability, and functionality while still maintaining sufficient size when being used to block excess light from the overhead projector light surface.

Figure 4:
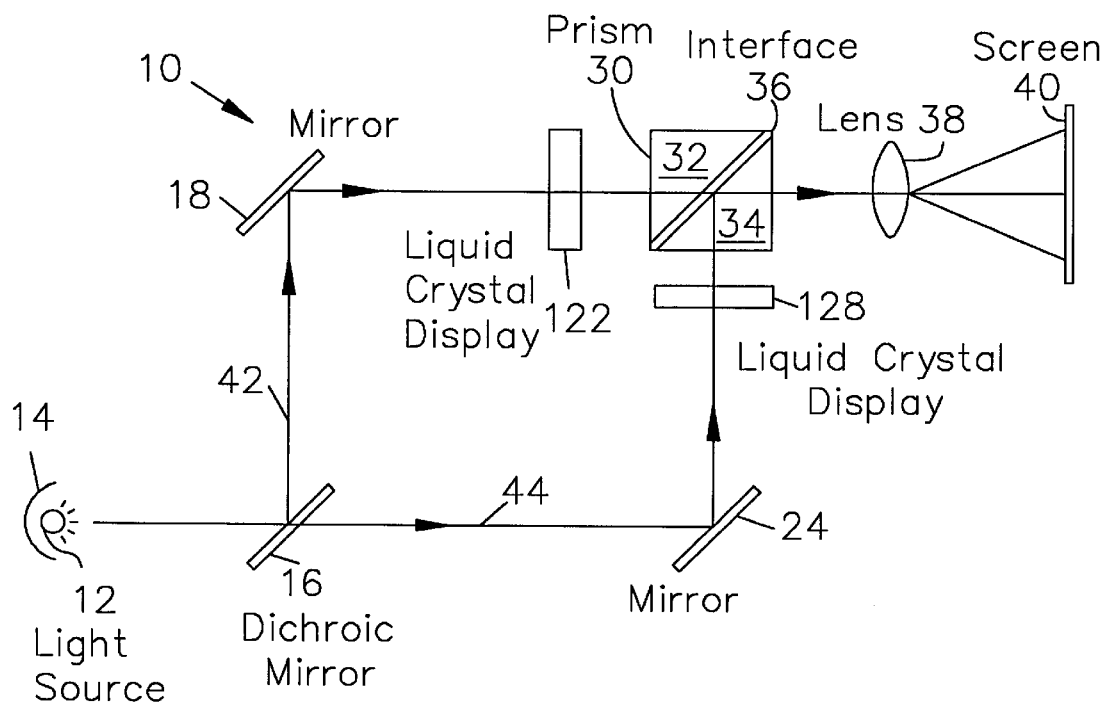
FIG. 4 illustrates a preferred embodiment for a color pixel two display system.
Figure 5A:
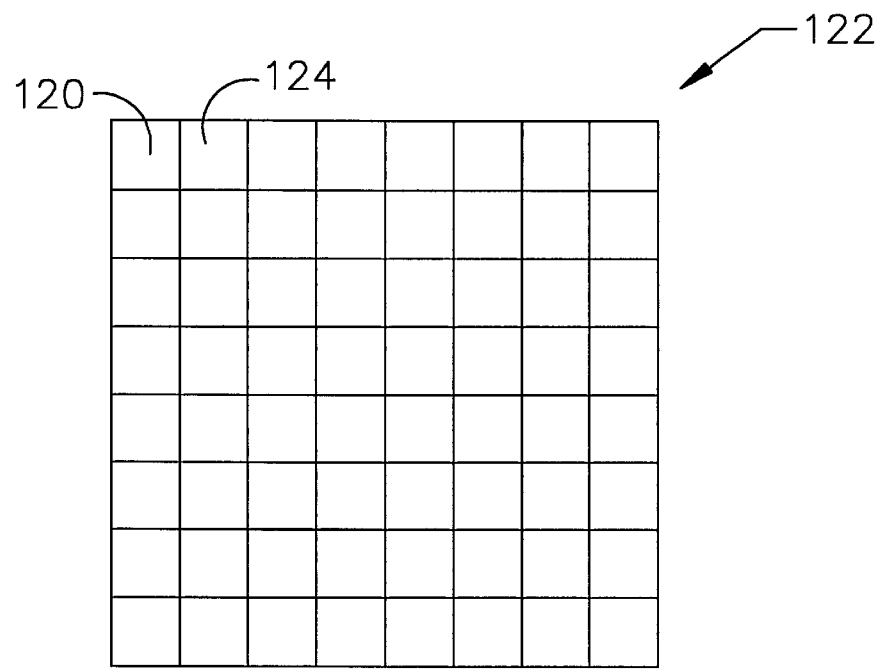
FIG. 5A and 5B schematically illustrate another preferred embodiment of the invention employing two light valve displays.
Figure 5B:
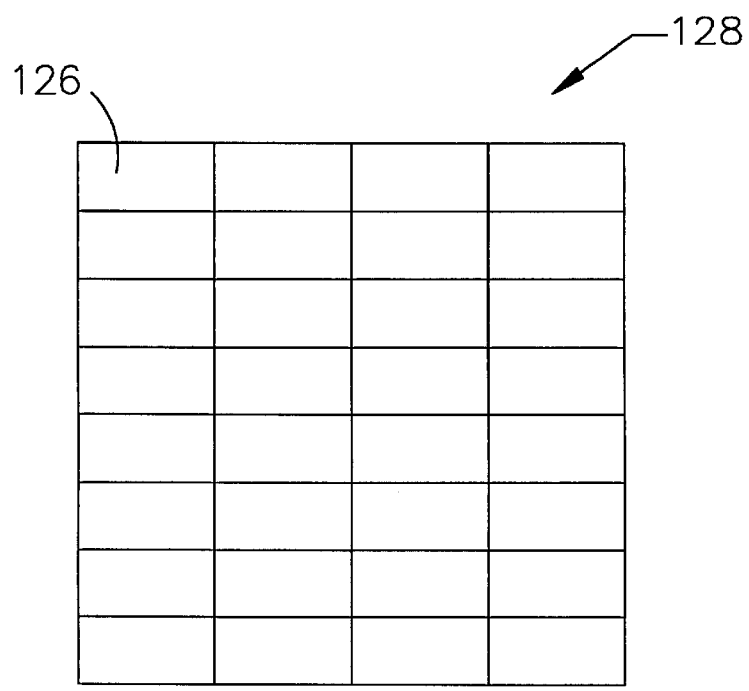

Another preferred embodiment is illustrated in FIG. 4 using two liquid crystal displays 122, 128. In this embodiment, light from source 12 is split into different colors by dichroic mirror 16. Mirrors 18, 24 direct light through the two displays 122,128, respectively. Combiner 30 combines the two images produced by the two displays into a system color image and projected using lens 38. The first display 122 as shown in FIG. 5A has pixel elements formed using pairs of blue 120 and red transmitting 124 color filters, for example. Each pixel element from the first display 122 is aligned with a pixel 126 from the second display 128 as shown in FIG. 5B, which in this example, transmits only green.

Figure 6:
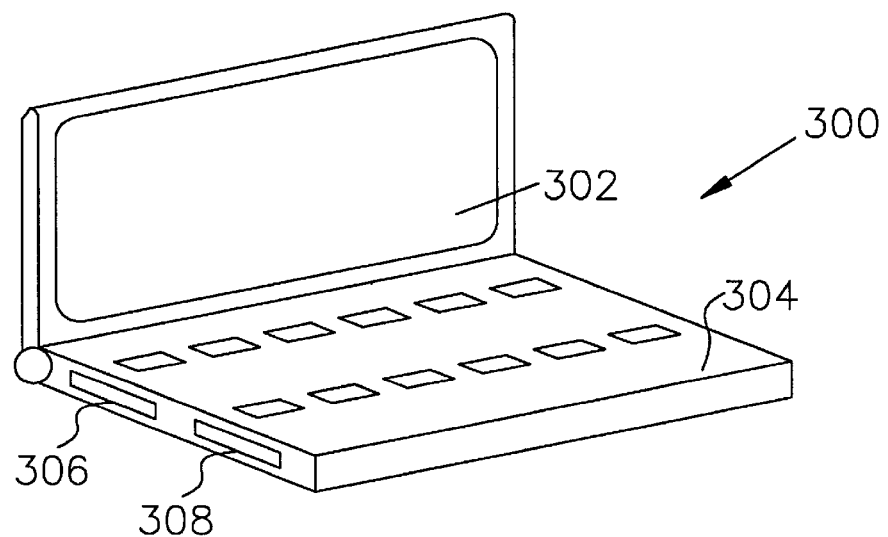
FIG. 6 illustrates a direct view display in a portable system using the flat panel display system of FIG. 2A.

Another preferred embodiment of the invention is illustrated in connection with FIG. 6 in which a direct view display 302 and a keyboard 304 provide a notebook computer, or alternatively, a hand held personal digital assistant 300. The display 302 is formed using the laminated structure of FIG. 2A. The personal computer or hand held display device 300 can include a modem 306 to provide internet or web access, is battery powered, and can include or be connected to a disk drive or CD Rom drive, digital camera or scanner 308.

Figure 7:
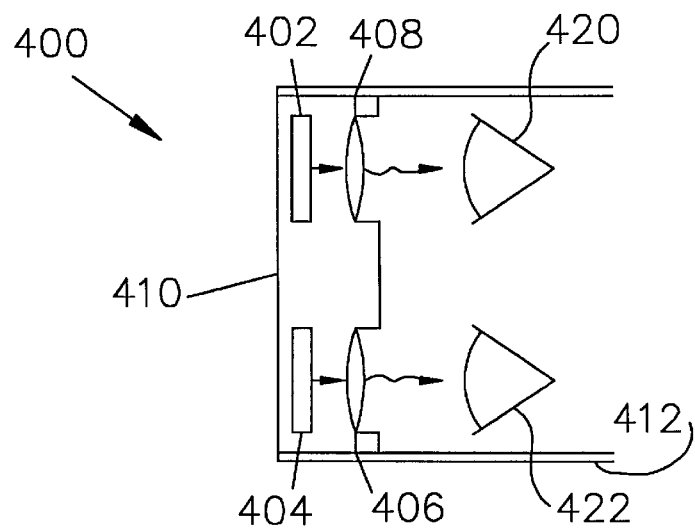
FIG. 7 illustrates the use of a pair of the flat panel display system of FIG. 2A in a head mounted display.

Smaller display systems having the structure of FIG. 2A, having diagonal dimensions between 0.5 and 1.5 inches can also be fabricated for a variety of applications including the head mounted display system 400 of FIG. 7. The system 400 includes a frame or band 412 to secure the system relative to the head of a user to align displays 402,404 relative to the rights and left eyes 420,422 of the user. Each display 402, 404 directs a color image through a lens system 408,406 to the user's eyes. A housing 410 mounted to the frame or band 412 contains the optical components and can include electronic display driver and audio components. Each display 402,404 includes a thin backlight as a light source such as a fluorescent type, an electroluminescent display or other emissive display.

Figure 8:
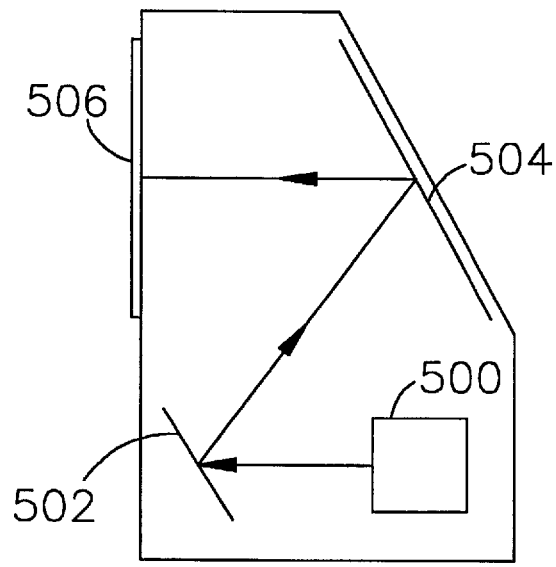
FIG. 8 schematically illustrates a rear projection computer monitor or television in accordance with the invention.

Another preferred embodiment is illustrated in FIG. 8 where the two light valve systems 500 described herein are used in a rear projection computer monitors and television receivers. Mirrors 502,504 are used to direct images generated by the system 500 onto a rear view screen 506.

Equivalents

While this invention has been particularly shown and described with reference to preferred embodiments thereof, it will be understood by those skilled in the art that various changes in form and details may be made therein without departing from the spirit and scope of the invention as defined by the appended claims.

We claim:

1. A liquid crystal display system comprising:
   a light source;
   a first liquid crystal display and a second liquid crystal display, each display being positioned on an optical path to receive light from the source; and
   a color shutter system positioned along an optical path between the source and the first liquid crystal display, the color shutter system comprising a retarder or a cholesteric film such that the color shutter system controls transmission of a primary color through the first display, the first display generating an image that is combined with an image generated by the second display to provide a color image.

2. The liquid crystal display system of claim 1 wherein the color shutter system comprises first and second color shutters.

3. The liquid crystal display system of claim 1 further comprising an optical combiner.

4. The liquid crystal display system of claim 1 further comprising a projection lens that projects the color image on a viewing surface.

5. The liquid crystal display system of claim 3 wherein the combiner comprises a dichroic prism.

6. The liquid crystal display system of claim 1 wherein the color shutter system has a first state transmissive to a first primary color and a second state transmissive to a second primary color.

7. A liquid crystal display system comprising:
   a light source;
   a first liquid crystal display and a second liquid crystal display, both displays being positioned on an optical path to receive light from the source;
   a color shutter system positioned along the optical path between the source and the first liquid crystal display such that the color shutter controls transmission of a primary color through the display; and
   a retarder between the color shutter and the first display, the retarder altering a polarization state of the primary color without altering a polarization state of a second primary color.

8. The liquid crystal display system of claim 7 wherein the first display, the second display, the color shutter and the retarder comprise a laminated structure having a thickness of less than 25 mm.

9. The liquid crystal display system of claim 8 further comprising a second retarder between the first liquid crystal display and the second liquid crystal display.

10. The liquid crystal display system of claim 7 further comprising a lens to project images on a viewing surface.

11. The liquid crystal display system of claim 7 further comprising a frame that mounts the liquid crystal display system to a user's head.

12. The liquid crystal display system of claim 7 further comprising a keyboard on a housing incorporating the liquid crystal display system.

13. The liquid crystal display system of claim 8 wherein the retarder adjusts a portion of a spectrum from the light source to be an eigenstate of the display.

14. The liquid crystal display system of claim 8 wherein the retarder is a compound retarder.

15. The liquid crystal display system of claim 8 wherein the retarder comprises an achromatic quarterwave plate and a cholesteric film.

16. A color shutter display system comprising:
   a first display, a second display, and a third display, said displays being positioned on an optical path;
   a first retarder positioned between the first display and the second display; and
   a second retarder positioned between the second display and the third display such that the display system generates a color image.

17. The display system of claim 16 further comprising a microlens array positioned between the first display and the second display.

18. The display system of claim 16 further comprising a lens that receives an image from the third display to project an image on a viewing surface.

19. The display system of claim 16 further comprising a plurality of polarizers.

20. The display system of claim 16 wherein the optical path extends along a single axis.

21. The display system of claim 16 wherein the first retarder alters the polarization state of a first primary color and the second retarder alters the polarization state of the first primary color.

22. The display system of claim 21 wherein the first retarder circularly polarizes the first primary color and the second retarder linearly polarizes the first primary color.

23. The display system of claim 21 wherein the first retarder is a compound retarder.

24. The display system of claim 16 wherein the system comprises a head mounted display.

25. The display system of claim 16 wherein each display comprises a liquid crystal display.

26. A method of displaying a color image comprising:
   providing a first display, a second display, and a third display, said displays being positioned on an optical path;
   providing a first retarder positioned between the first display and the second display;
   providing a second retarder positioned between the second display and the third display;
   directing light from a light source through the first display;
   altering a polarization state of a first color of light with the first retarder without altering a polarization state of a second color;
   directing the first color and the second color onto the second display such that the first color is unaltered by the second display; and
   altering a polarization state of the first color with the second retarder.

27. The method of claim 26 further comprising a microlens array positioned between the first display and the second display.

28. The method of claim 26 further comprising a lens that receives an image from the third display to project an image on a viewing surface.

29. The method of claim 26 further comprising a plurality of polarizers.

30. The method of claim 26 wherein the optical path extends along a single axis.

* * * * *